(12) United States Patent
Bianchi

(10) Patent No.: US 10,421,620 B2
(45) Date of Patent: Sep. 24, 2019

(54) SYSTEM AND METHOD FOR TRANSFERRING POUCHES

(71) Applicant: FILLSHAPE S.R.L., Zola Predosa (IT)

(72) Inventor: Paolo Bianchi, Corcagnano (IT)

(73) Assignee: FILLSHAPE S.R.L., Zola Predosa (IT)

( * ) Notice: Subject to any disclaimer, the term of this patent is extended or adjusted under 35 U.S.C. 154(b) by 23 days.

(21) Appl. No.: 15/570,649

(22) PCT Filed: Feb. 19, 2016

(86) PCT No.: PCT/IB2016/050907
§ 371 (c)(1),
(2) Date: Oct. 30, 2017

(87) PCT Pub. No.: WO2016/174530
PCT Pub. Date: Nov. 3, 2016

(65) Prior Publication Data
US 2018/0290838 A1    Oct. 11, 2018

(30) Foreign Application Priority Data

Apr. 30, 2015 (IT) .............................. PR2015A0031

(51) Int. Cl.
| | | |
|---|---|---|
| *B65B 43/50* | (2006.01) | |
| *B65G 47/86* | (2006.01) | |
| *B65B 61/18* | (2006.01) | |

(52) U.S. Cl.
CPC .............. *B65G 47/847* (2013.01); *B65B 43/50* (2013.01); *B65B 61/186* (2013.01); *B65G 2201/0238* (2013.01)

(58) Field of Classification Search
CPC .......... B65G 47/847; B65G 2201/0238; B65B 43/50

(Continued)

(56) References Cited

U.S. PATENT DOCUMENTS 4,995,223 A * 2/1991 Spatafora ................ B65B 11/32
                                                                 53/176
5,125,500 A * 6/1992 Cailbault ................. B07C 3/082
                                                                198/470.1

(Continued)

FOREIGN PATENT DOCUMENTS

JP    S55142410 U    10/1980
JP    S58134802 A     8/1983

(Continued)

OTHER PUBLICATIONS

International Search Report dated Jun. 1, 2016 re: Application No. PCT/IB2016/050907; pp. 1-3; citing: JP S55 142410 U, JP H02 34406 U, JP S58 134802 A and JP H06 24414 A.

(Continued)

*Primary Examiner* — Douglas A Hess
(74) *Attorney, Agent, or Firm* — Cantor Colburn LLP

(57) ABSTRACT

A method for transferring pouches for containing products, includes the steps of gripping two corresponding flaps of a pouch with first and second grippers, and transferring the pouch between a first turntable and a second conveyor. One out of the first turntable and the second conveyor include the first and second grippers for gripping corresponding flaps of the pouch, and the other includes third and fourth grippers for gripping the pouch. The step of transferring the pouch between the first turntable and the second conveyor includes gripping the pouch with the third grippers. The method further includes releasing the first grippers that are gripping the pouch, gripping the pouch with the fourth grippers, and releasing the second grippers that are gripping the pouch.

6 Claims, 4 Drawing Sheets

(58) Field of Classification Search
USPC .......... 198/377.07, 407, 467.1, 470.1, 474.1,
198/575, 604, 605, 608
See application file for complete search history.

(56) References Cited

U.S. PATENT DOCUMENTS

| | | | | |
|---|---|---|---|---|
| 5,941,367 A * | 8/1999 | Osti | ........................ | B65B 35/58 |
| | | | | 198/475.1 |
| 6,186,313 B1 * | 2/2001 | Spatafora | ................ | B65B 19/04 |
| | | | | 198/474.1 |
| 7,681,713 B2 * | 3/2010 | Nishi | ..................... | B65G 29/00 |
| | | | | 198/469.1 |
| 7,823,717 B2 * | 11/2010 | Zanini | ..................... | B65B 43/46 |
| | | | | 198/470.1 |
| 7,870,947 B2 * | 1/2011 | Mader | .................. | B65H 29/003 |
| | | | | 198/468.2 |
| 8,651,853 B2 * | 2/2014 | Dupuis | ................. | B29C 49/421 |
| | | | | 198/459.8 |
| 9,061,832 B2 * | 6/2015 | Rack | ...................... | B65G 29/00 |

FOREIGN PATENT DOCUMENTS

| | | |
|---|---|---|
| JP | H0234406 A | 3/1990 |
| JP | H0624414 A | 2/1994 |

OTHER PUBLICATIONS

Written Opinion dated Jun. 1, 2016 re: Application No. PCT/IB2016/050907: pp. 1-6; citing: JP S55 142410 U, JP H02 34406 U, JP S58 134802 A and JP H06 24414 A.

* cited by examiner

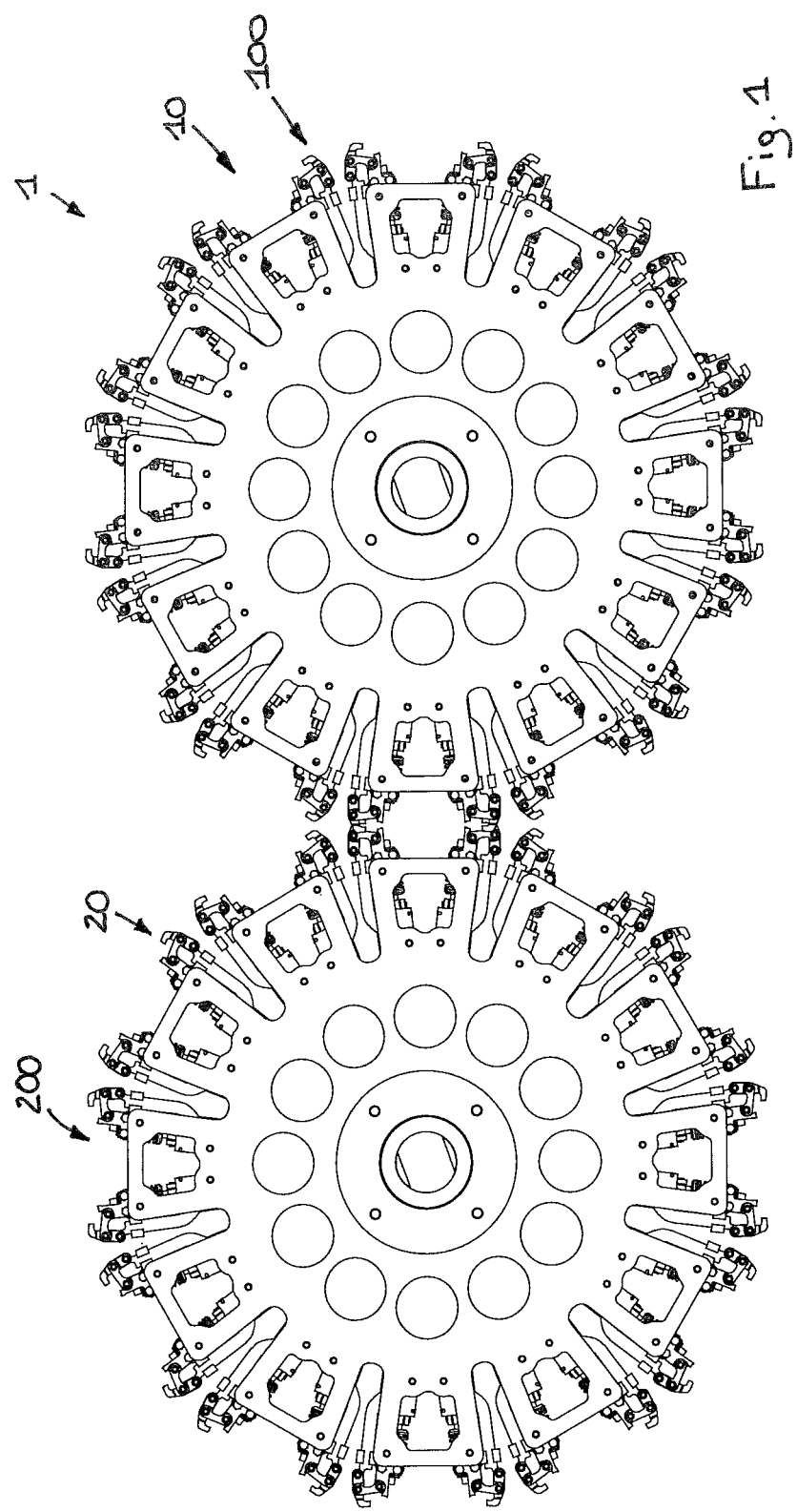

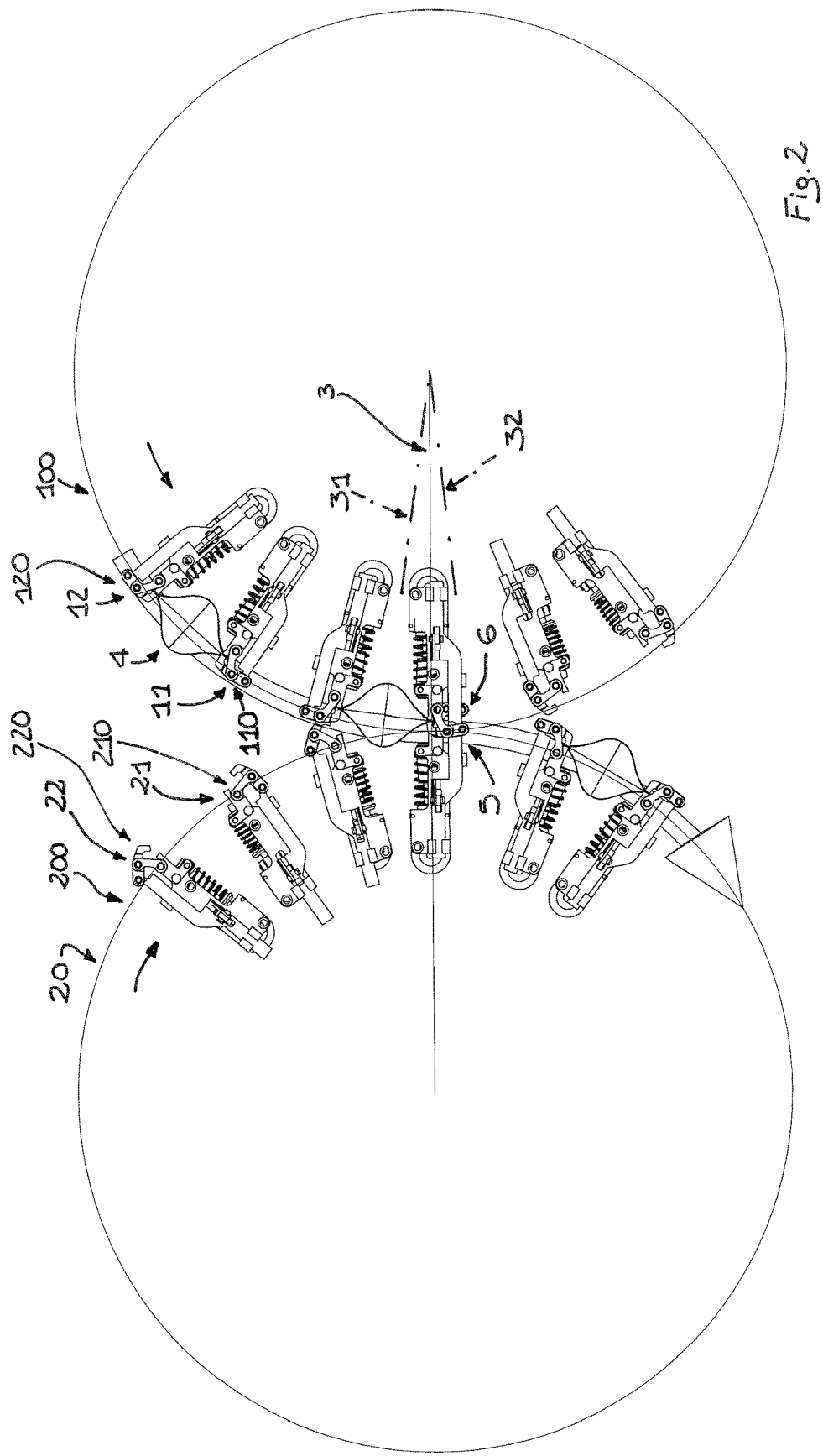

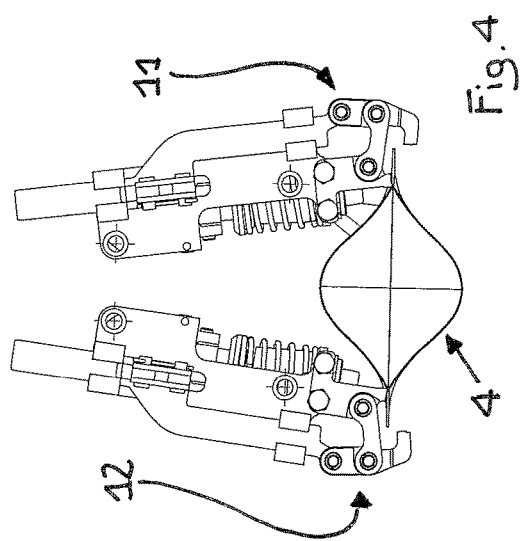
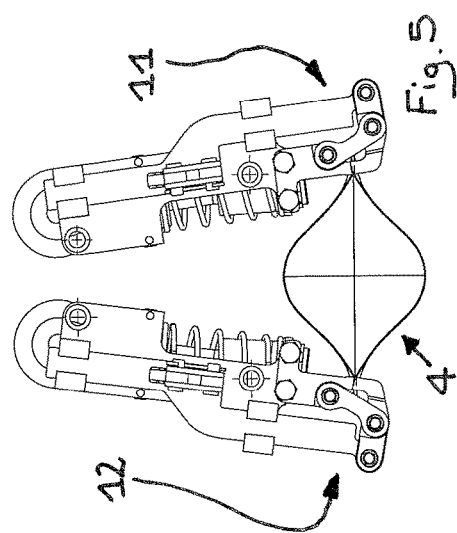
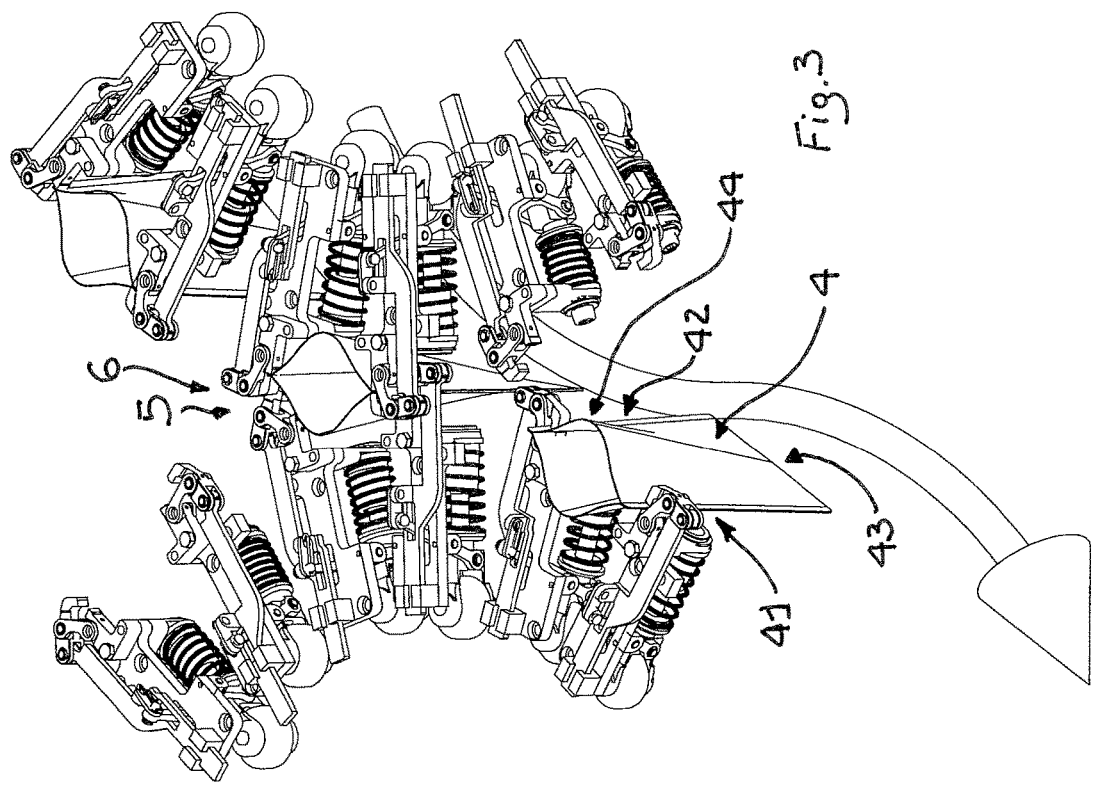

SYSTEM AND METHOD FOR TRANSFERRING POUCHES

TECHNICAL FIELD

The present invention relates to a system and a method for transferring pouches for containing products. Such products may be food products. Typically, the products are in liquid or granular form. Once the pouch is complete, it may have a dispensing nozzle welded to an edge thereof. The nozzle is rigid whereas the pouch is flexible. In an alternative solution, the nozzle may be absent and for dispensing, for example, a flap of the pouch may be cut or a straw could be used to be inserted into it.

BRIEF SUMMARY

A system for moving pouches is known wherein gripping means are provided that grip and move the pouch holding onto it by the nozzle (which is the most rigid part).

The pouches may therefore be moved by turntables cooperating with one another. In that case, a turntable grips the pouch by the nozzle and releases it at the next turntable which in turn grips it by the nozzle.

In an alternative solution, pneumatic means push the pouches making them advance along specific guides.

In this context, the technical task underpinning the present invention is to propose a system and a method for transferring pouches that allows movement of the pouches that is fast and does not risk damaging them even if no nozzle is provided or the nozzle has not yet been applied to them.

The defined technical task and the specified aims are substantially achieved by a control system and method for transferring pouches, comprising the technical characteristics set forth in one or more of the appended claims.

BRIEF DESCRIPTION OF THE DRAWINGS

Further characteristics and advantages of the present invention will become more apparent from the approximate and thus non-limiting description of a preferred, but not exclusive, embodiment of a control system and method for transferring pouches, as illustrated in the accompanying drawings, in which:

FIG. 1 is a view from above of a system for transferring pouches according to the present invention;

FIG. 2 shows a view from above of the system of FIG. 1 with some parts removed to better highlight others;

FIG. 3 shows a perspective view of a part of FIG. 2;

FIGS. 4 and 5 show two distinct configurations of a component of a transfer system according to the present invention;

DETAILED DESCRIPTION OF PREFERRED EMBODIMENTS OF THE INVENTION

Figure 6:
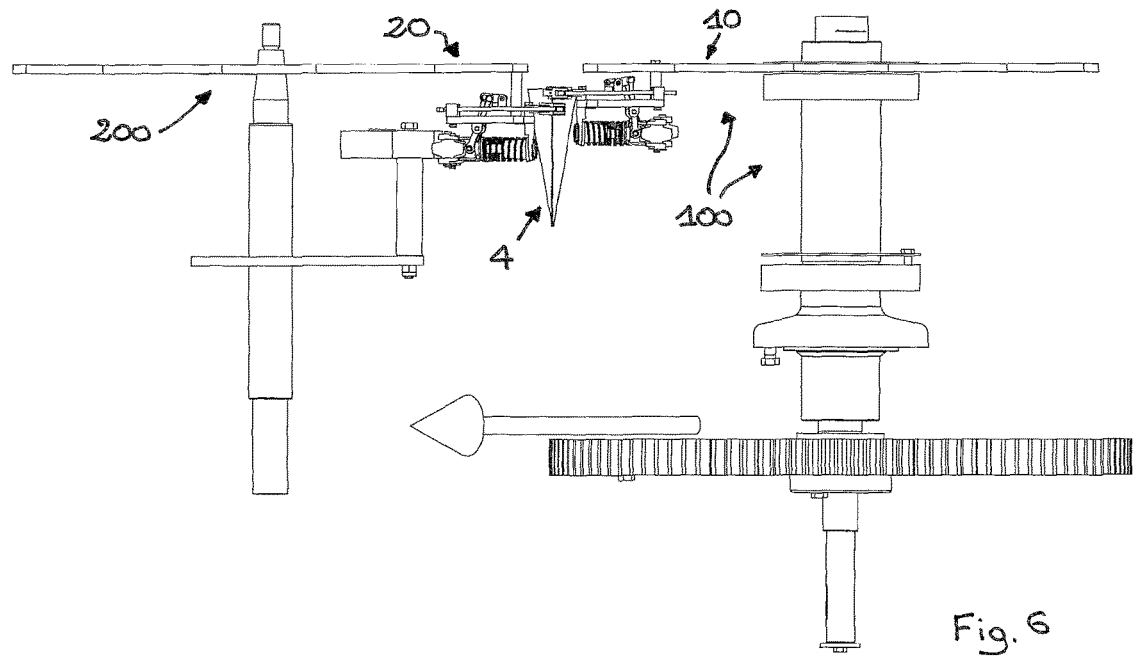
FIGS. 6 and 7 show lateral views of two distinct systems for transferring pouches according to the present invention.

In the appended figures, reference number 1 denotes a system for transferring pouches for containing products.

The system 1 comprises a first conveyor 10 comprising a first turntable 100 in turn comprising first and second gripping means 11, 12 intended to grip two distinct parts of the same pouch.

The first and second gripping means 11, 12 extend in succession along the circumferential perimeter of the first turntable 100.

In particular, the first gripping means 11 comprise a first gripper 110. The second gripping means 12 comprise a second gripper 120. The first gripper 110 can be activated independently from the second gripper 120.

In particular, the first and the second grippers 110, 120 are closed or opened independently. In particular, the first and the second grippers 110, 120 are closed or opened using mechanical cams. Elastic means exert an opposing force to the action exerted by the cams of the first and the second grippers 110, 120.

In an alternative solution not illustrated the first and second gripping means 11, 12 could comprise suction means that withhold the pouch by generating a depression in two distinct points thereof. In that case, the first and the second gripping means 11, 12 respectively comprise a first and a second suction cup.

The system 1 also comprises a second conveyor 20 intended to exchange pouches with the first turntable 100. The second conveyor 20 comprises third and fourth gripping means 21, 22 intended to grip two distinct parts of the same pouch. The third and fourth gripping means 21, 22 extend in succession along an advancement direction of the second conveyor 20. Also in this case, the third gripping means 21 advantageously comprise a third gripper 210. Likewise, the fourth gripping means 22 comprise a fourth gripper 220. Alternatively, the third and fourth gripping means 21, 22 could comprise corresponding suction means which withhold the pouch generating an appropriate depression (solution not illustrated).

Figure 7:
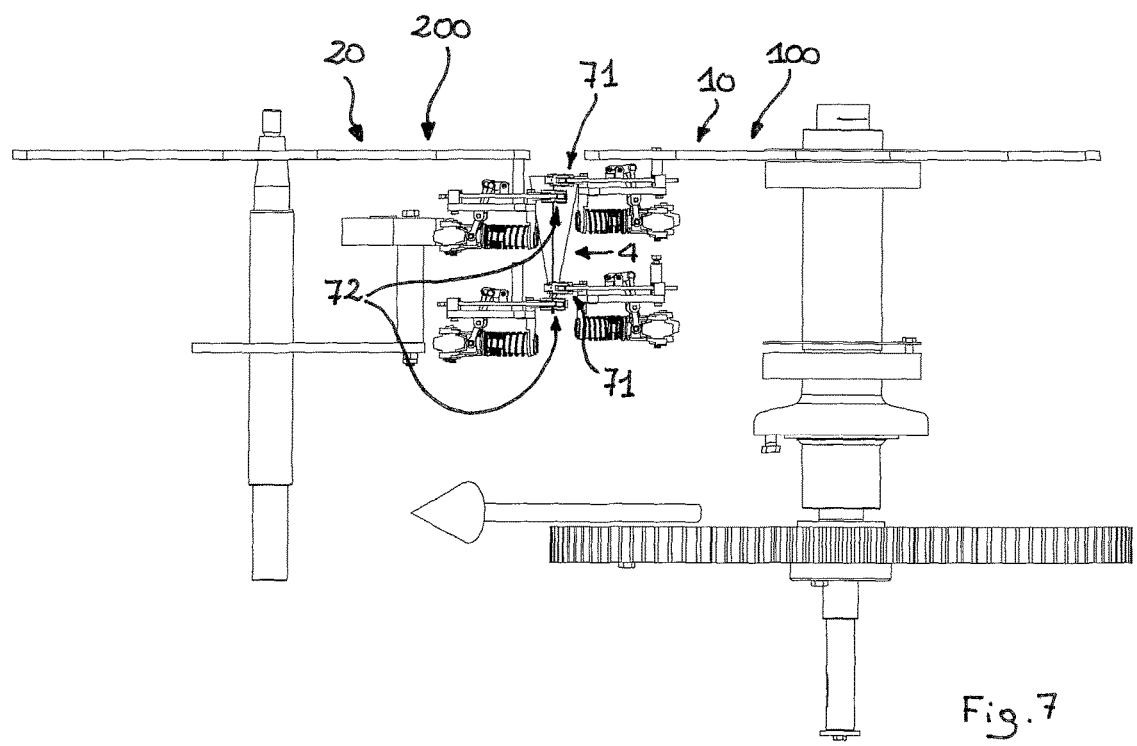

In the solution exemplified in FIG. 7, the first gripping means comprise a first pair 71 of grippers in which one surmounts the other. This enables the pouch to be gripped in two overlapping zones. Likewise, the third gripping means 21 comprise a second pair 71 of grippers in which one surmounts the other. Appropriately, the grippers of the second pair 72 of grippers are at a different height from the grippers of the first pair of grippers 71.

Advantageously a gripper of the second pair 72 of grippers is at an intermediate height with respect to the grippers of the first pair 71 of grippers.

A transfer zone 5 of the pouch between said first gripping means 11 and the second conveyor 20 is placed at an overlap zone between the trajectory of the first gripping means 11 and the trajectory of the third gripping means 21.

A transfer zone 6 of the pouch between said second gripping means 12 and the second conveyor 20 is placed at an overlap zone between the trajectory of the second gripping means 12 and the trajectory of the fourth gripping means 22.

Advantageously, the second conveyor 20 comprises a second turntable 200. With respect to an axis of rotation of the first turntable 100 the transfer zone 5 of the pouch between said first gripping means 11 and the second conveyor 20 takes place in the same zone in which the transfer of the pouch between the second gripping means 12 and the second conveyor 20 takes place. The same zone is located along a straight line that joins the axis of rotation of the first and the second turntable 100, 200. This also corresponds to a tangency zone between the primitive diameters of the first and the second turntable 100, 200 (with respect to an orthogonal plan view to the axes of rotation of the turntables).

In other words, with respect to an absolutely fixed reference in space, zones 5 and 6 coincide. Hence, there will first be the transfer of the pouch between the first gripping means 11 and the second conveyor 20 and then the transfer of the pouch between the second gripping means 12 and the second conveyor 20.

At the transfer zone 5 of the pouch between the first gripping means 11 and the second conveyor 20, the trajectory followed by the first gripper 110 lies above or below the trajectory followed by the third gripper 210.

At the transfer zone 6 of the pouch between the second gripping means 12 and the second conveyor 20, the trajectory followed by the second gripper 120 lies above or below the trajectory followed by the fourth gripper 220.

With reference to what is indicated previously, a gripper is a component advantageously comprising two jaws which enable it to clamp a flap of a pouch between them.

The subject matter of the present invention is also a method for transferring pouches for containing products. Appropriately, the method is implemented by a system for transferring pouches comprising one or more of the characteristics described hereinabove. The method comprises the steps of:

i) gripping two corresponding flaps of a pouch by means of first and second gripping means 11, 12 (typically the pouch is arranged vertically and the two flaps can be found at opposite vertical sides of the pouch 4); as indicated above the first gripping means 11 preferably comprise a first gripper 110 or aspirator; the second gripping means 12 comprise a second gripper 120 or an aspirator;

ii) transferring said pouch 4 between a first turntable 100 and a second conveyor 20.

The step of transferring the pouch between the first turntable 100 and the second conveyor 20 is after the step of gripping using the first and second gripping means 11, 12 two corresponding flaps of a pouch.

One out of the first turntable 100 and the second conveyor 20 comprises the first and second gripping means 11, 12 of corresponding flaps of the pouch, the other comprising third and fourth gripping means 21, 22 of the pouch.

The step of transferring the pouch between the first turntable 100 and the second conveyor 20 comprises the sub-steps of:

gripping the pouch 4 by means of the third gripping means 21;

releasing the first gripping means 11 that are gripping the pouch 4;

gripping the pouch 4 by means of the fourth gripping means 22;

releasing the second gripping means 12 that are gripping the pouch 4;

The steps of gripping the pouch 4 by means of the fourth gripping means 22 and releasing the second gripping means 12 take place after the step of gripping the pouch 4 by means of the third gripping means 21 and the step of releasing the first gripping means 11. In fact, to prevent damaging/breaking the pouch 4, the pouch 4 must be transferred between a gripper of the turntable 100 and a gripper of the conveyor 20 at the tangency zone of the primitive diameters of the turntables. Since the pouch 4 is gripped by a pair of grippers that transit at distinct times at said tangency zone, it is necessary that in the transit that accompanies the transfer of the pouch between the turntable 100 and the conveyor 20 it be supported by at least one gripper of the turntable 100 and by at least one gripper of the conveyor 20. On this point, the flexibility of the pouch 4 enables it to follow the trajectory change imposed by the passage between the turntable 100 and the second conveyor 20.

With respect to the advancement direction of the first turntable 100 and the second conveyor 20 the first gripper 110 is in front of the second gripper 120. Likewise, with respect to the advancement direction of the first turntable 100 and the second conveyor 20 the third gripper 210 is in front of the fourth gripper 220.

Preferably, the pouch 4 is transferred from the first turntable 100 to the second conveyor 20; the first turntable 100 therefore comprises the first and the second gripping means 11, 12 while the second conveyor 20 comprises the third and the fourth gripping means 21, 22. In an alternative solution, it may happen that the pouch is transferred from the second conveyor 20 to the first turntable 100.

The step of transferring the pouch 4 between the first turntable 100 and the second conveyor 20 comprises:

an initial and a final step in which the pouch 4 is only gripped by the first turntable 100 or the second conveyor 20;

an intermediate step in which the pouch is gripped simultaneously by the first turntable 100 and the second conveyor 20.

Appropriately, the steps of gripping the pouch 4 by means of the third gripping means 21 and releasing the first gripping means 11 are substantially simultaneous.

Likewise, the steps of gripping the pouch 4 by means of the fourth gripping means 22 and releasing the second gripping means 12 are substantially simultaneous.

The second conveyor 20 could be a belt conveyor but in the preferred solution it is a second turntable 200.

Being defined:

a reference plane 3 containing the axis of rotation of the first and the second turntable 100, 200;

a first and a second plane 31, 32 containing the axis of rotation of the first turntable 100, that lie on opposite semispaces with respect to said reference plane 3 and that form with said reference plane 3 an angle of less than 3°, preferably less than or equal to 1°; the steps of gripping the pouch 4 by means of the third gripping means 21, releasing the first gripping means 11, gripping the pouch 4 by means of the fourth gripping means 22 and releasing the second gripping means 12 take place in a space comprised between the first and the second plane 31, 32.

In particular the steps of gripping the pouch 4 by means of the third gripping means 21, releasing the first gripping means 11, gripping the pouch 4 by means of the fourth gripping means 22 and releasing the second gripping means 12 take place at the reference plane 3.

The steps of gripping the pouch 4 by means of the third gripping means 21, releasing the first gripping means 11, gripping the pouch by means of the fourth gripping means 22 and releasing the second gripping means 12 take place at the tangency point of the primitive diameters of the first and the second turntable 100, 200. In fact, at the tangency point the peripheral speed of the first and the second turntable 100, 200 may coincide. Advantageously the pouch 4 comprises:

a first flap 41 that is gripped in succession by the first and the third gripping means 11, 21;

a second flap 42 opposite the first flap 41 that is gripped in succession by the second and the fourth gripping means 12, 22; the first and the second flaps are two lateral edges of the perimeter of the pouch 4;

a bottom 43 that connects the first and the second flap 41, 42;

an edge 44 that connects the first and the second flap 41, 42.

Advantageously the top edge 44, in the cases which provide for the presence of the outlet nozzle of the product from the pouch, allow it to be housed.

In the preferred solution the step of applying a dispensing nozzle to the pouch 4 takes place following the step of transferring the pouch 4 between the first turntable 100 and the second conveyor 20. Appropriately, the step of transferring the pouch 4 between the first turntable 100 and the second conveyor 20 envisages transferring the pouch already filled with the product to be contained or still empty. Possibly, at the upper edge 44, two overlapping sheets that define the pouch are moved away from one another (and wait to receive the nozzle, where provided; it is underlined that the presence of the nozzle is not essential).

As mentioned previously the pouch 4 is more flexible than the dispensing nozzle. Although it is made of plastic, the nozzle is more rigid than the sheets that define the pouch 4.

In a particular solution, the method envisages filling the pouch 4 during the time it spends on the first or the second conveyor 10, 20 (advantageously on the first or the second turntable 100, 200).

The invention thus conceived makes it possible to achieve multiple advantages.

In particular, it enables the pouches to be transferred without gripping them by the nozzle and without damaging or breaking them (which could happen if the pouches were supported by pairs of gripping means and transferred between one turntable and another conveyor in a zone in which the trajectories were not tangential).

The invention thus conceived is susceptible to numerous modifications and variants, all of which falling within the scope of the inventive concept characterizing the invention. Moreover, all details may be replaced with other technically equivalent elements. All the materials used, as well as the dimensions, may in practice be of any type, according to needs.

The invention claimed is:

1. A method for transferring pouches for containing products comprising the following steps:
    gripping two corresponding flaps of a pouch by means of first and second gripping means;
    transferring said pouch between a first turntable and a second conveyor; one out of the first turntable and the second conveyor comprising the first and second gripping means for gripping corresponding flaps of the pouch, the other comprising third and fourth gripping means for gripping the pouch; the step of transferring the pouch between the first turntable and the second conveyor comprising the sub-steps of:
    gripping the pouch by means of the third gripping means;
    releasing the first gripping means that are gripping the pouch;
    gripping the pouch by means of the fourth gripping means;
    releasing the second gripping means that are gripping the pouch;
    the steps of gripping the pouch by means of the fourth gripping means and releasing the second gripping means taking place after the step of gripping the pouch by means of the third gripping means and the step of releasing the first gripping means.

2. The method according to claim 1, wherein the steps of:
    gripping the pouch by means of the third gripping means and releasing the first gripping means are substantially simultaneous;
    gripping the pouch by means of the fourth gripping means and releasing the second gripping means are substantially simultaneous.

3. The method according to claim 1, wherein the second conveyor is a second turntable;
    being defined:
        a reference plane containing an axis of rotation of the first and the second turntable;
        a first and a second plane containing the axis of rotation of the first turntable, that lie on opposite semispaces with respect to said reference plane and that form with said reference plane an angle of less than 3°; the steps of gripping the pouch by means of the third gripping means, releasing the first gripping means, gripping the pouch by means of the fourth gripping means and releasing the second gripping means taking place in a space comprised between the first and the second plane.

4. The method according to claim 3, wherein the steps of gripping the pouch by means of the third gripping means, releasing the first gripping means, gripping the pouch by means of the fourth gripping means and releasing the second gripping means takes place at the reference plane.

5. The method according to claim 1, wherein the pouch comprises:
    a first flap that is gripped in succession by the first and the third gripping means;
    a second flap opposite the first flap that is gripped in succession by the second and the fourth gripping means;
    a bottom that connects the first and the second flap;
    an upper edge that connects the first and the second flap.

6. The method according to claim 1, wherein a step of applying a dispensing nozzle to the pouch takes place following the step of transferring the pouch between the first turntable and the second conveyor.

* * * * *